US010255424B1

(12) United States Patent
Lunsford et al.

(10) Patent No.: US 10,255,424 B1
(45) Date of Patent: Apr. 9, 2019

(54) GENERATING AGGREGATED DATA FROM FRAGMENTED INPUTS

(71) Applicants: Todd Lunsford, West Bloomfield, MI (US); Rodney Golpe, Royal Oak, MI (US); Steve Ghidro, Ferndale, MI (US)

(72) Inventors: Todd Lunsford, West Bloomfield, MI (US); Rodney Golpe, Royal Oak, MI (US); Steve Ghidro, Ferndale, MI (US)

( * ) Notice: Subject to any disclaimer, the term of this patent is extended or adjusted under 35 U.S.C. 154(b) by 0 days.

(21) Appl. No.: 15/873,522

(22) Filed: Jan. 17, 2018

Related U.S. Application Data

(60) Provisional application No. 62/618,313, filed on Jan. 17, 2018, provisional application No. 62/447,322, filed on Jan. 17, 2017.

(51) Int. Cl.
| | | |
|---|---|---|
| *G06F 21/40* | (2013.01) | |
| *H04L 29/06* | (2006.01) | |
| *G06F 17/30* | (2006.01) | |
| *H04L 9/32* | (2006.01) | |
| *G06F 21/31* | (2013.01) | |
| *H04L 9/08* | (2006.01) | |

(52) U.S. Cl.
CPC ........ *G06F 21/40* (2013.01); *G06F 17/30598* (2013.01); *G06F 21/31* (2013.01); *H04L 9/085* (2013.01); *H04L 9/321* (2013.01); *H04L 9/3226* (2013.01); *H04L 9/3297* (2013.01); *H04L 63/0876* (2013.01); *H04L 63/102* (2013.01)

(58) Field of Classification Search
CPC .... G06F 17/30598; G06F 21/31; G06F 21/40; H04L 63/0876; H04L 63/102; H04L 9/085; H04L 9/321; H04L 9/3226; H04L 9/3297
See application file for complete search history.

(56) References Cited

U.S. PATENT DOCUMENTS

| | | | | |
|---|---|---|---|---|
| 2004/0030932 A1* | 2/2004 | Juels | ...................... | H04L 63/083 713/151 |
| 2009/0031125 A1* | 1/2009 | Bjorn | .................... | H04L 9/0825 713/155 |
| 2018/0139057 A1* | 5/2018 | Truu | ...................... | H04L 9/3247 |

OTHER PUBLICATIONS

Desmedt Y., Frankel Y. (1992) Shared generation of authenticators and signatures. In: Feigenbaum J. (eds) Advances in Cryptology—CRYPTO '91. CRYPTO 1991. Lecture Notes in Computer Science, vol. 576. Springer, Berlin, Heidelberg (Year: 1992).*

* cited by examiner

*Primary Examiner* — Theodore C Parsons
(74) *Attorney, Agent, or Firm* — Kilpatrick Townsend & Stockton LLP

(57) ABSTRACT

A method of verifying a challenge value may include receiving the challenge value from a client device; accessing an external data store to receive data rows that may be associated with a user of the client device; filtering data rows that are not sourced from computer systems associated with the challenge value; grouping the data rows into groups based on which of the computer systems each of the data rows were sourced; determining an input velocity for each of the groups; determining an interval value for each of the groups based on the input velocity; calculating a group value for each of the groups based on the interval value and the input velocity; calculating an estimated total value based on the group values; and determining whether the challenge value can be verified by determining whether the estimated total value is within a threshold of the challenge value.

19 Claims, 13 Drawing Sheets

GENERATING AGGREGATED DATA FROM FRAGMENTED INPUTS

CROSS-REFERENCES TO RELATED APPLICATIONS

This application claims the benefit of U.S. Provisional Application 62/447,322 filed on Jan. 17, 2017, which is incorporated herein by reference. This application also claims the benefit of U.S. Provisional Application 62/618,313, which is incorporated herein by reference.

TECHNICAL FIELD

This application discloses technology related to the fields of data processing and data retrieval. Specifically, this application discloses technology solutions for verifying a challenge value provided to a website before a resource is provided to a client device by filtering and aggregating data values from various secure sources to reconstruct an estimate of the challenge value.

BACKGROUND

Challenge value verification describes a paradigm where a client device provides a challenge value to a server that must be verified independently by the server to ensure that the challenge value is correct, and to possibly verify an identity of the user. Verification of the challenge value can unlock access to resources that the server can provide to the user of the client device.

SUMMARY

In some embodiments, a system for verifying a challenge value received from a client device may include a front-end website that receives the challenge value from the client device, and a network interface that accesses one or more external data stores to receive a plurality of data rows from the one or more external data stores, where the plurality of data rows may be associated with a user of the client device. The system may also include one or more processors and one or more memory devices including instructions that, when executed by the one or more processors, cause the one or more processors to perform operations including filtering data rows from the plurality of data rows that are not sourced from one or more computer systems associated with the challenge value. The operations may also include grouping data rows from the plurality of data rows into one or more groups based at least in part on which of the one or more computer systems associated with the challenge value each of the plurality of data rows were sourced. The operations may additionally include determining an input velocity for each of the one or more groups, determining an interval value for each of the one or more groups based at least in part on the input velocity, calculating a group value for each of the one or more groups based on the interval value and the input velocity, and calculating an estimated total value based at least in part on the group values for each of the one or more groups. The operations may further include determining whether the challenge value can be verified by determining whether the estimated total value is within a threshold amount of the challenge value.

In some embodiments, a method of verifying a challenge value received from a client device may include receiving the challenge value from the client device through a front-end website, and accessing, through a network interface, one or more external data stores to receive a plurality of data rows from the one or more external data stores, where the plurality of data rows may be associated with a user of the client device. The method may also include filtering data rows from the plurality of data rows that are not sourced from one or more computer systems associated with the challenge value. The method may additionally include grouping data rows from the plurality of data rows into one or more groups based at least in part on which of the one or more computer systems associated with the challenge value each of the plurality of data rows were sourced. The method may further include determining an input velocity for each of the one or more groups, determining an interval value for each of the one or more groups based at least in part on the input velocity, calculating a group value for each of the one or more groups based on the interval value and the input velocity, and calculating an estimated total value based at least in part on the group values for each of the one or more groups. The method may also include determining whether the challenge value can be verified by determining whether the estimated total value is within a threshold amount of the challenge value.

In any embodiments, one or more of the following features may be included in any combination and without limitation. The method/operations may further include adding or removing a task from a task list for a resource based on whether the challenge value can be verified. The challenge value may be an unverified value. The one or more external data stores may receive the plurality of data rows from one or more issuing computer systems. The front end web site may provide a portal for the client device to the one or more external data stores to log into the one or more issuing computer systems to release the plurality of data rows. The method/operations may also include filtering data rows from the plurality of data rows where a value field does not exceed a threshold amount. The method/operations may additionally include removing non-alphanumeric tokens from a text field of the data row, and removing a blacklist set of known tokens. Grouping the data rows from the plurality of data rows into the one or more groups may include forming a first group with a first data row, adding additional data rows to the first group when a text field in the additional data rows matches a text field in the first data row, and forming an additional group when a text field in a data row does not match the text field in the first data row. Matching data rows may include using a fuzzy match algorithm with a result above a threshold amount. The method/operations may further include scaling the group value for a least one of the one or more groups before calculating the estimated total value; wherein a scaling value is determined based at least in part on the group value.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1A:
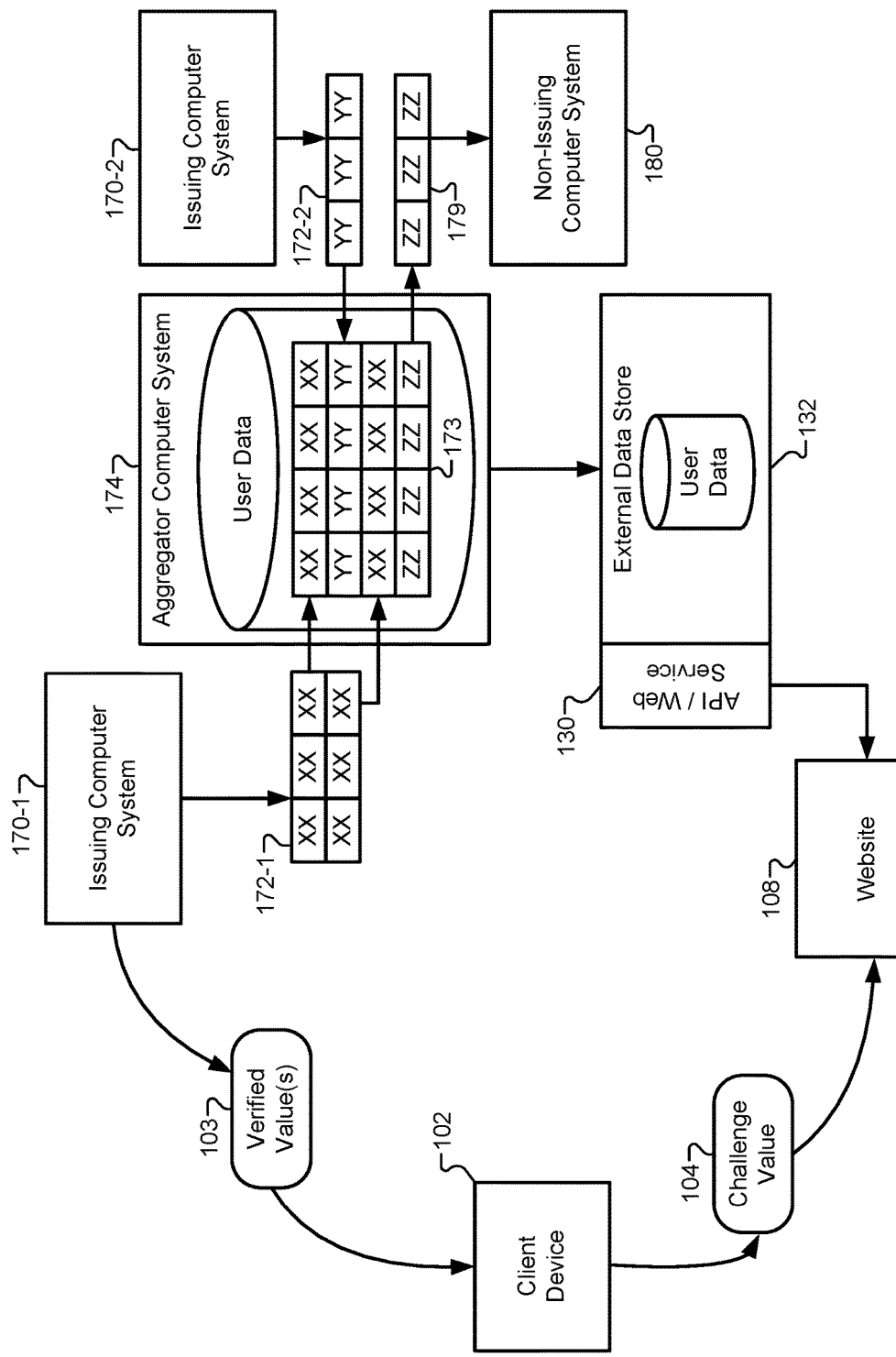
FIG. 1A illustrates a simplified block diagram of how the challenge value and a plurality of data rows from which the challenge value may be estimated are provided to the website, according to some embodiments.

Described herein are embodiments for verifying a value received from a client device by a website. A user may know or be given one or more verified values, and the user can generate a challenge value from the verified values. The value entered into the client device may be considered a challenge value sent to the website. The website may use the challenge value to grant a particular resource to the client device and/or the user. In some cases, the challenge value may be verified to be entered correctly and not to be fraudulent. One or more issuing computer systems can provide the values to the user, and these provided values can be aggregated to form the verified value. Additionally, in a separate data path, the one or more issuing computer systems can provide components of the verified values to an aggregator computer system. The aggregator computer system can take the information from the issuing computer systems and form data rows that are stored in a data store, such as a database, associated with the user. The aggregator computer system can receive the components of the verified values periodically at regular intervals. To verify the challenge value, the website can extract the data rows from the data store using an external data store API, and the website can then perform a number of filtering and grouping operations to reconstruct interval values and input velocities using the components of the verified values provided to the aggregator computer system represented by the data rows. Group values can be determined, and in some cases scaled, and used to estimate a total value extracted from the aggregator computer system. The challenge value can then be compared to the estimated total value to verify the challenge value. If the challenge value is within a threshold amount of the estimated total value, the challenge value can be verified. In some embodiments, the verification of the challenge value can then be used to approve access to a resource, approve access to alternative resources, or deny access altogether.

This system for verifying challenge values can have numerous applications. For example, verifying the challenge value can be a way of validating an identity of a user. The issuing computer systems can provide one or more verified values to the user, and the user can construct the challenge value based on the one or more verified values. To provide a second pathway for information associated with the verified values to be presented to the website, the issuing computer systems can break the verified values up into periodic inputs that are received over time. Thus, an eavesdropper would need to monitor the transmissions from the issuing computer systems for months or years to glean enough data to determine the verified values. Additionally, an eavesdropper would need to monitor the transmissions from each of the issuing computer systems providing verified values to the user. The aggregator computer system can collect transmissions from the issuing computer systems along with inputs from non-issuing computer systems and provide data rows representing all of these inputs to the website for verification. In order to extract an estimate of the challenge value, the website can then perform the filtering, grouping, cleansing, and/or scaling operations described below. This embodiment provides a method of securely verifying the challenge value to verify the identity of the user.

FIG. 1A illustrates a simplified block diagram of how the challenge value 104 and a plurality of data rows 173 from which the challenge value 104 may be estimated are provided to the website 108, according to some embodiments. First, one or more issuing computer systems 170 can provide one or more verified values 103 to the user of the client device 102. In one example, the issuing computer systems 170 can each provide single numerical values to the user that will be considered the verified values 103 from each source. In some embodiments, the verified values 103 may represent a secret code, a PIN, a token, and/or any other confidential information. The issuing computer systems 170 may be a middleman or trusted third-party that issues the verified values 103. The verified values 103 may be provided to the user by any communication method from the issuing computer systems 170, such as on printed media, by regular mail, by email, by text message, and/or the like. In some embodiments, a representative of the issuing computer systems 170 may verbally communicate the verified values 103 to the user.

The user may access the website 108 through a client device 102. The client device 102 may include any computing device, such as a smart phone, a smart watch, a PDA, a laptop computer, a desktop computer, a tablet computer, a voice-activated digital assistant, an augmented reality device, a virtual reality device and/or any other computing device that can receive inputs from the user and provide outputs. As used herein, the term "website" may include a traditional website or web form accessible through a web browser on a computer. This term may also encompass network-based access to a web server through an application running on a smart phone. Thus, claims referring to a website also encompass accessing a web resource through a dedicated application ("app") as well as through a traditional web browser.

The user may request a resource from the website 108. In order to determine which resources the user may be allowed to access, the website 108 may ask for a challenge value 104. The user may construct the challenge value 104 based on the verified values 103 received earlier by the user. For example, the user may aggregate the verified values 103 to generate the challenge value 104. Note that in some embodiments, a single verified value may be used (i.e., there is only one issuing computer system). More than one verified value is not necessary. In this case, the challenge value 104 will be approximately the same as the single verified value provided to the user. The user may provide the challenge value 104 to the website by entering the challenge value 104 into the client device 102.

The challenge value 104 may be received by the website 108 as an unverified value. In other words, the website 108 may not have enough information at this point to verify that the challenge value 104 accurately represents an aggregation of the verified values 103. Instead of manually reaching out to the issuing computer systems 170 to collect the verified values 103, the embodiments described herein provide a more secure and convenient way of verifying the challenge value 104 by the website 108.

In some implementations, each of the issuing computer systems can break each of the verified values 103 down into a plurality of component values, or simply "components" 172. The components 172 can be used to reconstruct each of the verified values 103. In a security context, the issuing computer systems 170 can break down the verified values using an algorithm, such as a variation of Shamir's Secret Sharing (S3) algorithm to deconstruct the data into one or more data segments. Each of these data segments can be packaged as components 172 or transmissions to an aggregator computer system 174. These components 172 can be delivered periodically over time such that they are never delivered all together. For example, the components 172 can be individually transmitted in sequence every 5 days, every 10 days, once a week, twice a month, every 2 weeks, once a month, every 2 months, once a year, and so forth. This incremental transmission of data components 172 can protect both the user and the issuing computer system.

The aggregator computer system 174 may receive transmissions that include data components 172 from each of the issuing computer systems 170. The components 172 in these transmissions can be associated with a timestamp and stored in a data store as data rows in a data structure. In addition to the data value components in the timestamp, additional columns or fields may be added to each of the data rows to represent or classify the type of transmission. These additional fields will be described in greater detail below in relation to FIG. 4. As used herein, the term "data rows" may be used to represent a node in a data structure. For example, this may represent an actual row of data in a traditional database table. Each data row may be a data structure received in an array of data structures from the external data store. This may also represent a node in a linked list, an element in an array, a field in an XML document, and so forth. In addition to receiving transmissions from the issuing computer systems 170, the aggregator computer system 174 may also receive transmissions from non-issuing computer systems 180. The data components received from the non-issuing computer systems 180 can be used to generate data rows and stored in the same data store as the data rows generated from the issuing computer systems 170. The data rows from both sources can be stored in a specific data structure associated with the user. This mingling of data from both issuing and non-issuing sources can further obfuscate the data received from the issuing computer systems 170. Furthermore, the aggregator computer system 174 may also add its own data rows to the plurality of data rows 173 in the data store as transmissions to the non-issuing computer systems 180. Thus, the aggregator computer system 174 may add additional data rows to the data structure that are not associated with the verified values 103.

To reconstruct an estimate of the verified values 103, the website 108 can download a copy of the plurality of data rows 173 from the aggregator computer system 174. In some embodiments, the website 108 can communicate directly with the aggregator computer system 174 to download the plurality of data rows 173. In other embodiments, the website 108 may require the user credentials to access the plurality of data rows 173 at the aggregator computer system 174. In these embodiments, the website 108 can use an external data store 132 with an API or web service 130 that allows the user to login to the aggregator computer system 174 through the client device 102 without providing credentials to the website 108. The external data store can then download the plurality of data rows 173 from the aggregator computer system 174. The website can then establish a secure link with the external data store 132 and retrieve the plurality of data rows 173 from the external data store 132 without needing to securely access the aggregator computer system 174. This process will be described in greater detail below in relation to FIG. 1C. In some embodiments, users may have data structures stored at a plurality of aggregator computer systems. The external data store 132 can be used to login and download a plurality of data rows from each of the aggregator computer systems to which the issuing computer systems 170 transmit data components 172 for the verified values 103.

Figure 1B:
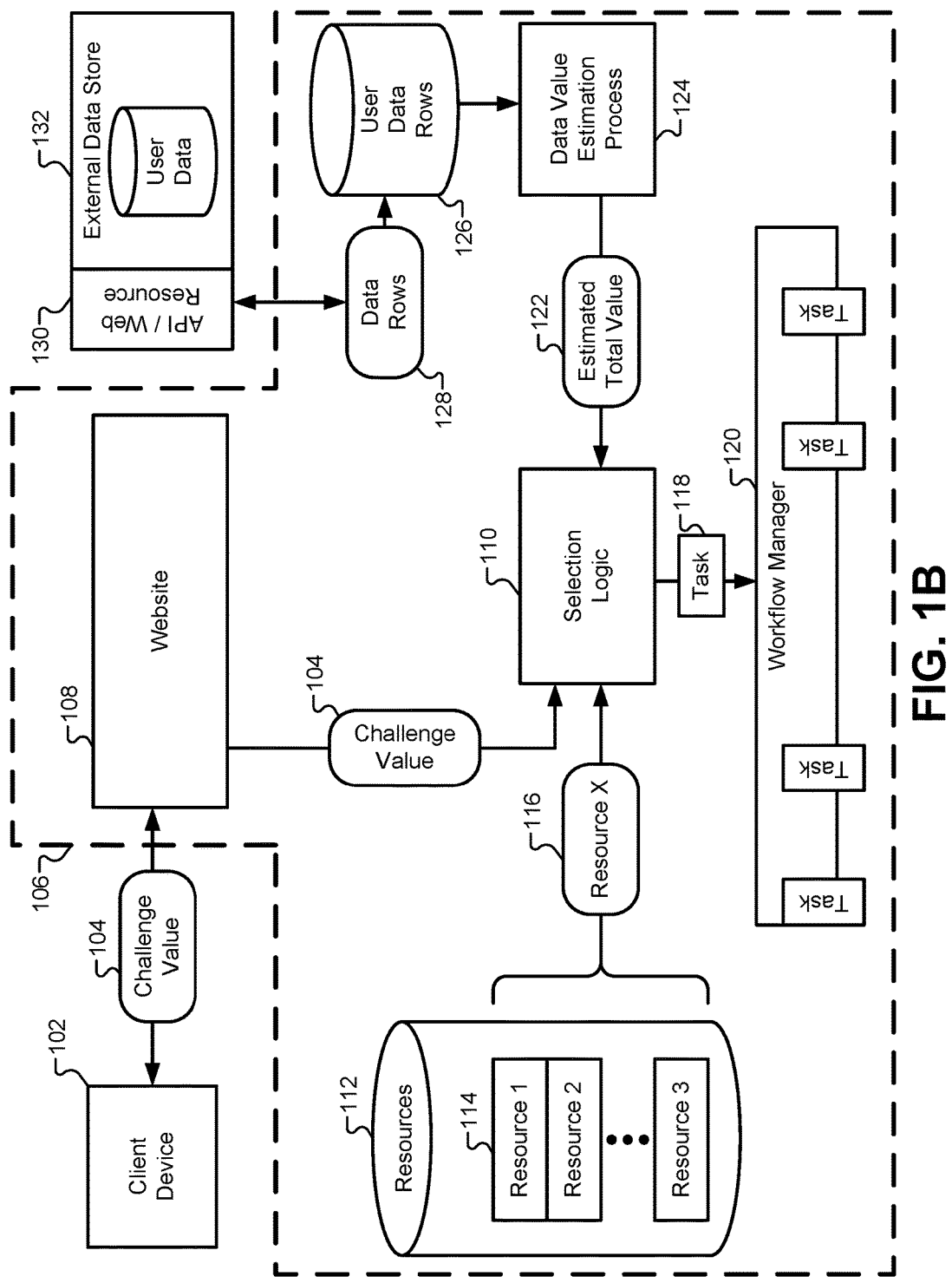
FIG. 1B illustrates a block diagram of a web server with a front-end web site, according to some embodiments.

FIG. 1B illustrates a block diagram of a system 106 with a front-end web site 108, according to some embodiments. For example, the system 106 can present a publicly accessible website 108 to which the client device 102 can be communicatively coupled through a network. For example, a user can login to the website 108 on their smart phone over a mobile cellular network. The client device 102 may be operated by a user who intends to explore various resources that may be available to the user via the website 108. The client device 102 may communicate through a network, such as a local area network, a wide-area network, the Internet, a cellular network, and so forth, using a network interface application, such as a web browser or an app operating on a smart phone.

In some embodiments, the website 108 may be hosted by a cloud service and provided through a content delivery network (CDN) that hosts websites, web content, and/or web services for the system 106. The cloud service may include server caches that are geographically distributed over a service area and provide the website 108 to the client device 102 upon request. The website 108 may include programming code, such as JavaScript, that provides front-end functionality to the website 108 when interacting with the client device 102. For example, the website 108 can solicit information required to generate resource recommendations to the user by walking the user through a series of web forms. The website 108 can also use information supplied by the client device 102 to solicit information from third-party, external data stores.

The website 108 is used merely as an example of one of the ways that the server 106 can interact with the client device 102. Therefore, this disclosure should not be limited to a website per se. Instead, the term website 108 throughout this disclosure may be replaced with any user interface capable of receiving data from the client device 102 and transmitting data between the client device 102 and the website 108. For example, another embodiment can provide a voice activated, audio interface for communicating with client devices through voice services such as Alexa® by Amazon® or Google Home®. Another embodiment can use an entertainment dashboard in a vehicle as an interface for communicating with the client device 102. Similarly, the web forms that may be presented through the website 108 are also used merely as an example that is specific to the website 108 environment. In this disclosure, the term "web form" may be replaced with any sort of digital form that can present and receive information to an applicant through the particular user interface. For example, the form could include interactive user interface elements displayed in an application running on a smartphone or smartwatch. In another example, the form could include audio provided to an applicant and audio received from an applicant in a voice-activated user interface. Therefore, the terms "website" and "web form" are merely used as examples, and are not meant to be limiting.

After soliciting information from the client device 102, the website 108 may receive a request from the client device 102 to generate an automatic recommendation of a set of resources for which the user may be authorized to use. In some embodiments, the resources may include any network resource, such as access to a computing system, services that may be available to the user, digital content that may be downloaded to the client device 102, and so forth. In some embodiments, the set of resources 114 that may be initially provided to the user may be based at least in part on the challenge value 104 provided from the client device 102. For example, challenge values 104 within a specific range may indicate that a user is qualified to use a specific set of resources. The initial set of resources 114 can be presented to the user on the client device 102, and the user may input a selection of one of the set of resources 114 to the client device, which can then be transmitted back to the website 108.

The particular arrangement and grouping of computing devices and computer systems in FIG. 1A is merely exemplary and not meant to be limiting. In some embodiments, the website 108 (or other equivalent user interface) may be hosted and/or provided by a proprietary data center owned and operated by the website provider, thereby eliminating the need for any third-party cloud service to host computer resources. In some embodiments, the website 108 and all the functionality of the system 106 may be hosted by one or more cloud services. In some embodiments, the website 108 may be hosted on a web server that is an integral part of the website provider's private data center.

Before the selected resource 116 can be granted to the client device 102, the challenge value 104 may need to be verified. The set of resources 114 may initially be provided as a range of resources so that a particular selected resource 116 can be chosen before the challenge value is verified 104. In some embodiments, security rules and/or other regulations may require that the challenge value 104 be verified before the selected resource 116 is provided for the user. Therefore, the system 106 can use the process described above to download a plurality of data rows 128 from the external data store 132. The plurality of data rows 128 can be stored in a data store 126 in a data structure that is specifically associated with the user of the client device 102. Thus, the plurality of data rows 128 can be used immediately to verify the challenge value 104, as well as in the future if the challenge value 104 needs to be re-verified. The embodiments described herein provide a way for the system to automatically estimate and/or verify the challenge value 104 using a proprietary data value estimation process 124.

To verify the challenge value 104, the system 106 can interface through an API or web service interface 130 with an external data store 132. The external data store 132 may be provided by a third-party provider and may be made available on a subscription basis or a transactional basis. The external data store 132 may allow the user to login to the aggregator computer system to select a data structure associated with the user and download a plurality of data rows for use in verifying the challenge value 104. The plurality of data rows 128 can be stored in a data store 126 that stores user data. Thus, for resource requests that take days or weeks to approve, the downloaded plurality of data rows 128 will be available to the system 106 as stored in the data store 126 throughout the process. In some embodiments, the plurality of data rows 128 can also be stored as plain text files on a secure file storage system and retrieved as needed.

In some embodiments, multiple external data stores 132 may be accessed by the system 106. For example, a first external data store may have access to a first set of aggregator computer systems, while a second external data store may have access to a second set of aggregator computer systems. When the user begins to type or indicate a particular aggregator computer system, the system 106 can determine which external data store will be most readily available to communicate with the selected aggregator computer system. In some embodiments, when a plurality of external data stores can access a selected aggregator computer system, the system 106 can select the external data store that provides the most data rows covering the longest time interval.

The external data store 132 typically will not return all of the data rows that have been received by the aggregator computer system. Instead, the aggregator computer system will only release a subset of those data rows, such as data rows received within the last 30 days, 60 days, 90 days, and so forth. Thus, the data value estimation process 124 may use the limited subset of data rows that have been released by the issuing computer system to estimate the verified values provided to the user. In some cases, the more data rows received and the longer the time interval covered, the better the estimation process may be.

The data value estimation process 124 can then extract the plurality of data rows 128 from the database 126 to generate an estimated total value 122 for comparison to the challenge value 104. According to the process described in detail below, the data value estimation process 124 can extract issuer-related rows from the plurality of data rows 128. These issuer-related rows can then be used to estimate the total value 122. The estimated total value 122 can then be returned to the selection logic 110 that qualifies and/or selects the user for one of the resources 112. If the selected resource 116 was initially offered to the user, the selection logic 110 can now compare the challenge value 104 with the estimated total value 122 to determine whether the challenge value 104 is accurate. If the challenge value 104 is not within a threshold amount of the estimated total value 122, the selection logic 110 can offer a different resource selected from the available resources 112 for which the user may be approved to receive.

Additionally, the selection logic 110 can interface with a workflow manager 120 to add/remove tasks from a workflow associated with the applicant. Providing a resource by the system 106 may include a number of tasks that are managed by the workflow manager 120, such as receiving additional data from the client device 102, verifying the additional data from the client device 102, approving user execution of the resource, etc. If the estimated total value 122 is close enough to the challenge value 104, the selection logic 110 can instruct the workflow manager 120 to remove the task related to verifying the challenge value 104. For example, a task in the workflow manager 120 may include mainly reaching out to the issuing computer systems 170 to verify the challenge value 104. Similarly, if the estimated total value 122 falls too far below/above the challenge value 104, a new task 118 can be added to the workflow manager 120 requiring manual verification of the verified values 103 before the use of the resource is approved.

Figure 1C:
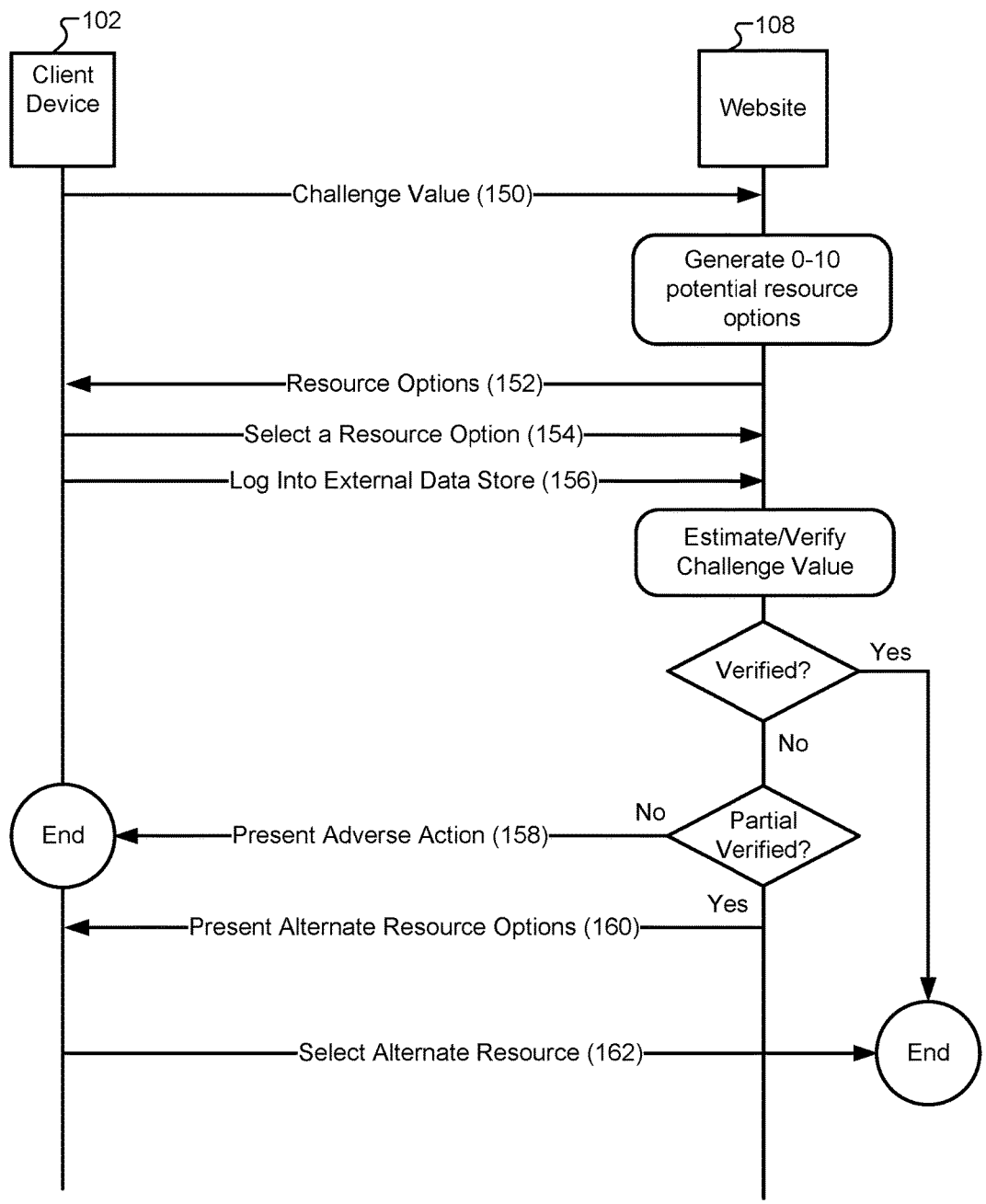
FIG. 1C illustrates a block diagram summarizing the process for approving the user for a resource by verifying a challenge value.

FIG. 1C illustrates a block diagram summarizing the process for approving the user for a resource by verifying a challenge value. The client device 102 can provide the website 108 with a set of user information from the client device 102 that is provided by the user, including the challenge value 104. (150). The website 108 can generate a plurality of potential resources for the user. The website 108 can then present the potential resources to the user (152), and the user can select one of the presented resource options (154). Then, using a process described in detail below, the client device 102 can login to the aggregator computer system (156) to provide the website 108 with a plurality of data rows stored by the aggregator computer system. The website 108 can use the plurality of data rows to verify the challenge value provided by the user. If the challenge value is verified, then providing the selected resource can be approved. If the challenge value is partially verified (i.e., the estimated total value is not close enough to the challenge value), then the website 108 can present alternate resource options to the client device 102 (160), and the client device 102 can provide a selection of an alternate resource (162). In cases where the challenge value cannot be verified, the website 108 can present an adverse action (158) to the client device 102, such as denial to any system resources.

Figure 2:
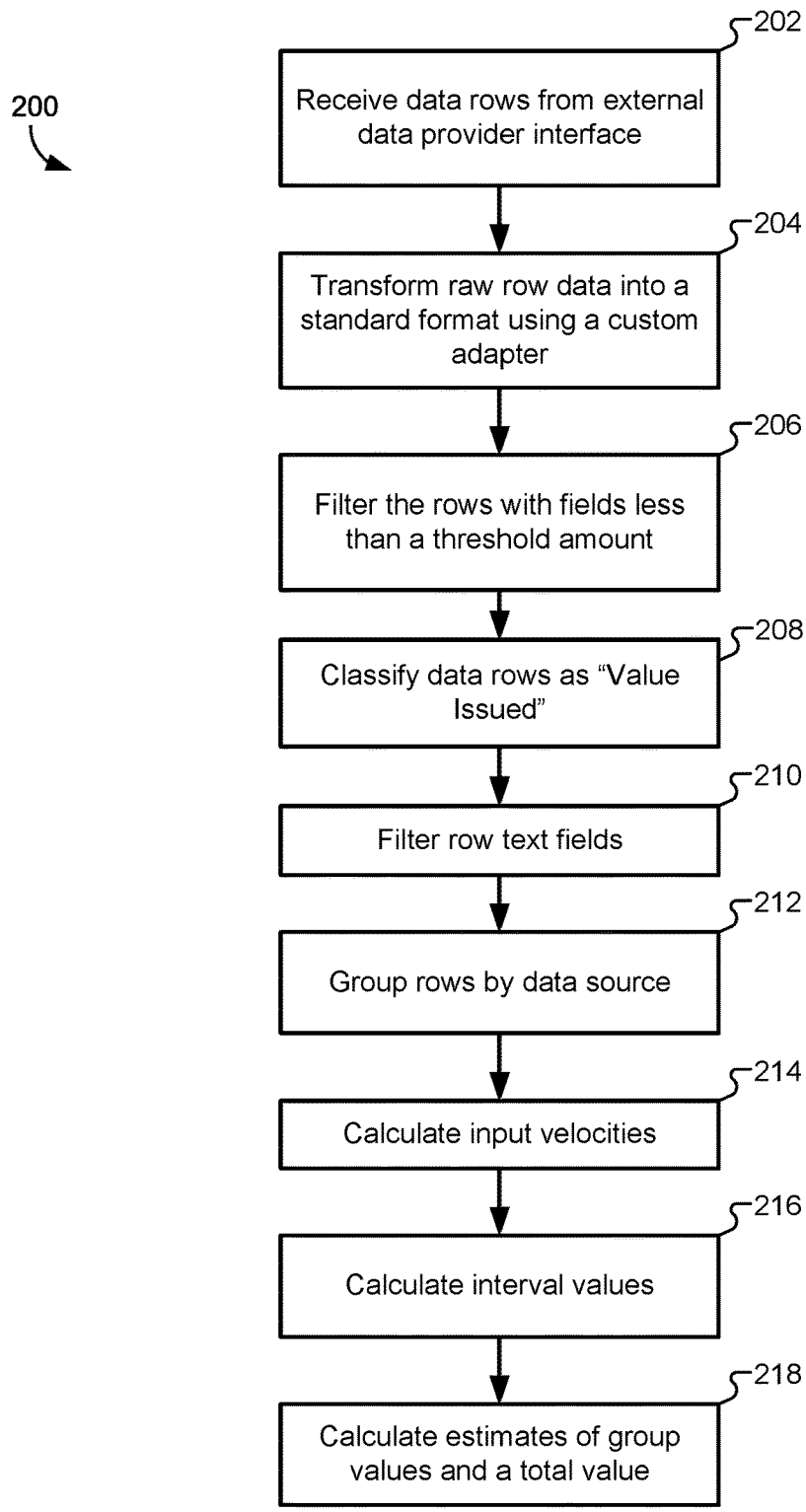
FIG. 2 illustrates a flowchart of a method for estimating a total value for verifying the challenge value, according to some embodiments.

FIG. 2 illustrates a flowchart 200 of a method for estimating a total value for verifying the challenge value, according to some embodiments. The flowchart 200 offers an overview of the entire process, each step of which is discussed in greater detail in the subsequent flowcharts below. The method may include receiving the plurality of data rows from the external data source (202). The plurality of data rows can be transformed from the raw data format received from the external data store into a standard format using a software custom adapter (204). Once properly formatted, the data rows can be filtered to remove data rows that involve less than a threshold amount in a value field (206). Some embodiments may also filter any outputs, as only input data rows are useful in estimating the challenge value. This may be accomplished by using output values, as negative values that will be less than a threshold amount. Next, the remaining data rows can be filtered based on a characterization provided by the external data store that identifies issuer-related input rows (208). After isolating issuer-related input rows, a text field in each data row can be scrubbed to remove extraneous characters (210). The remaining data rows can then be grouped by the issuer computer system identified by virtue of a fuzzy comparison between the text fields of different data rows (212). From each data row grouping, the process can estimate an input velocity (214) and an interval value (216) for each group. Based on the input velocity and interval value, the process can calculate an estimated group value for each group and subsequently an estimated total value to be compared to the challenge value (218).

Figure 3:
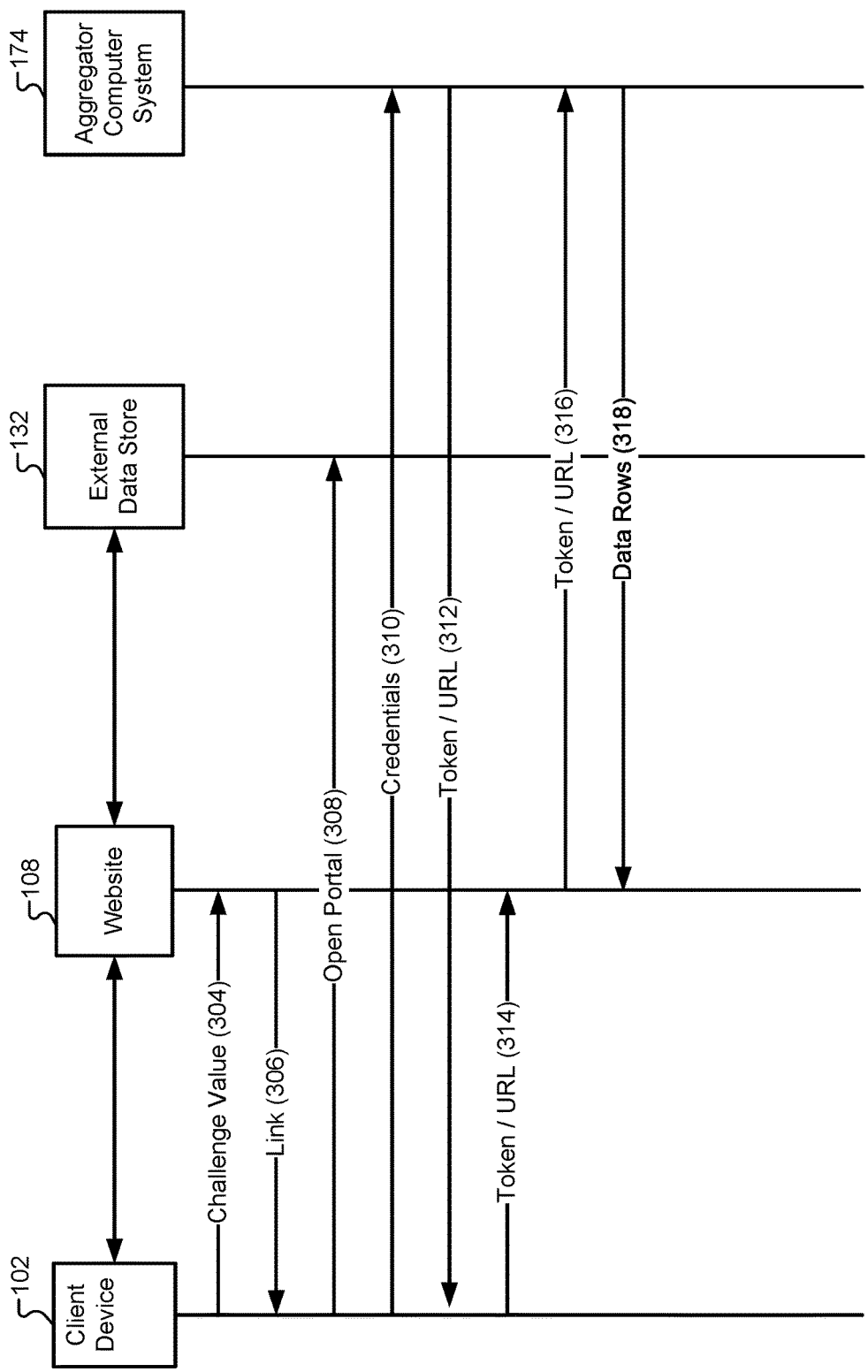
FIG. 3 illustrates a flow diagram of data rows being received from the external data store, according to some embodiments.

FIG. 3 illustrates a flow diagram of data rows being received from the external data store, according to some embodiments. The client device 102 can send the challenge value (304) to the website 108 as part of a web form that may include other data regarding the user. In order to verify the challenge value, the website 108 can provide an account link (306) to the client device 102 to initiate the verification process. For instance, the website 108 can provide a link, button, or other web control that asks the user to "Automatically Verify" the challenge vale. In some embodiments, when the user clicks on the link, the client device 102 can open a portal (308) to the external data store 132. This may include a pop-up window or other browser display that allows the client device 102 to communicate directly with the external data store 132 without necessarily losing the communication session with the website 108.

While in communication with the external data store 132, the client device 102 can be queried and provide account credentials (310). In some embodiments, the external data store 132 may present a list of available aggregator computer systems that can provide data rows to the external data store 132, and the user can sequentially select each aggregator computer system that can provide data rows associated with the user. The external data store can then provide a login page for the aggregator computer system 174 and allow the applicant to supply their credentials directly to an interface of the aggregator computer system 174. In other embodiments, the external data store 132 can receive the credentials from the user and then provide the credentials to the aggregator computer system 174 to log in. Other inputs may also be received from the client device 102, such as selecting specific data structures related to the user for download to the website 108.

After one or more data structures have been selected by the client device 102, the aggregator computer system can transfer a token, URL, or other identifier to the client device 102 (312). The token/URL can be transmitted (314) to the website 108 such that the website 108 can retrieve the data rows from the aggregator computer system 174. Note that in some embodiments, the aggregator computer system 174 and/or the external data store 132 can transmit the token/URL directly to the website 108 without sending it through the client device 102 first. After receiving the token/URL, the website 108 can send the token/URL (316) to the aggregator computer system 174 to retrieve data rows from any data structure selected by the user. The aggregator computer system 174 can then transmit a list of data rows (318) to the website 108 for processing.

Note that the order in which the operations of FIG. 3 are carried out can vary in different embodiments. For example, in one embodiment, when a user clicks on the web control to "Automatically Verify" the challenge value, the website 108 can first retrieve the token/URL from the external data store 132 and pass the token/URL to the client device 102. The website 108 may then optionally facilitate the client device 102 searching for a specific aggregator computer system 174, although this process may also be controlled entirely by the external data store 132. Once an aggregator computer system 174 has been found and selected, all communication between the client device 102, the external data store 132, and the aggregator computer system 174 may occur outside of the system 106 and website 108. After the user logs into the aggregator computer system 174 as described above, the website 108 can use the token/URL to request the data rows for the user from the external data store 132. Generally, the website 108 need not request information directly from the aggregator computer system 174.

Alternatively, the external data store 132 can contact the website 108 through a secure URL indicating that the user's data rows are ready to be downloaded using the previously provided token/URL.

It should be noted that allowing the client device 102 to open a portal with the external data store 132 and/or the aggregator computer system 174 bypasses the website 108. This prevents the website 108 from seeing or having access to credentials for the applicant's private data structures stored at the aggregator computer system. Instead, the website 108 can simply download a set of data rows from the external data store 132 and/or the aggregator computer system 174 without needing to provide any login credentials associated with the particular user. Thus, the website 108 does not need to store any user credentials or deal with the security requirements for logging into the external data store 132 and/or the aggregator computer system 174.

Turning back briefly to step 204 of flowchart 200, the set of data rows received from the external data store 132 and/or the aggregator computer system 174 may be formatted according to the requirements of the external data store 132 and/or the aggregator computer system 174. However, it may be advantageous to allow the website 108 to download data rows from many different aggregator computer systems using various external data stores 132 that provide access. Thus, the website 108 may need to deal with data row formats that vary greatly. Therefore, the system can provide software adapters that are specific to each external data store 132 and/or aggregator computer system 174. These software adapters can receive data rows in external formats, then translate those varying formats into a single, unified format that can be used by the data value estimation process. In some embodiments, the single format used by the data value estimation process can eliminate some fields provided by the external data store 132 and/or aggregator computer system 174, reformat some fields, add additional information to some fields, and so forth.

Turning back briefly to step 206 of flowchart 200, the method can begin by filtering data rows that have value fields with values that are less than a threshold amount. This begins a process of filtering the plurality of data rows to identify and isolate only rows that should contribute to the estimation process. This may involve removing data rows received from non-issuing computer systems, removing dummy rows, and removing any rows that would otherwise distort the estimated total value calculated below. In a security context, dummy information, extraneous rows, etc., may be added to the plurality of data rows to obfuscate the verified values that they represent. The process described below applies incremental filters to the plurality of data rows to isolate data rows that only contribute to one or more verified value. These data rows are then grouped and aggregated according to an input velocity before calculating a final estimated value.

Typically, the issuing computer systems 170 will only provide value fields that are above a predetermined threshold. A first step in eliminating extraneous data rows from the plurality of data rows may be removing the data rows having value fields that are clearly outside of the proper value range. Some embodiments may use upper limits and/or lower limits on the value field for filtering. This filtering process serves to greatly reduce the processing time required to estimate a total value, as well as significantly reduce the amount of memory required to store data rows for users during, after, and between verifications of the challenge value.

Figure 4:
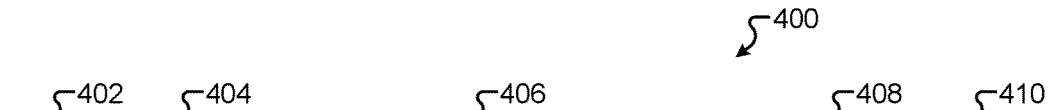
FIG. 4 illustrates a sample plurality of data rows that may be received from a single data structure at an aggregator computer system.

Turning back briefly to step 208 of flowchart 200, the method can begin classifying data rows as being inputs provided from the issuing computer systems 170. FIG. 4 illustrates a sample plurality of data rows 400 that may be received from a single data structure at an aggregator computer system. These data rows 400 may have been formatted by the custom adapter of the system as described above. It will be understood that this set of data rows 400 is merely exemplary and not meant to be limiting. Many other data fields/columns may be included that are not specifically shown in FIG. 4 for clarity. In one example, the set of data rows 400 may include a field 404 that characterizes the data row as an input, an output, and/or an input likely received from issuing computer system ("Value Input"). The characterization in field 404 may be made by the aggregator computer system when that particular data row is received. Each data row may also include a text field 406 that may provide a text code and/or textual description of the data row, a field 408 with a timestamp for when the data row was received, and a field 410 with a value for the data row. In some embodiments, the external data provider may include a field 402 that further characterizes the data row as an input, an output, a value input, and/or the like. In the example of FIG. 4, the field 402 includes an "VI" for each data row identified as a value likely received from an issuing computer system. As described below, this field 402 can be used by the system to further filter the plurality of data rows 400.

Figure 5:
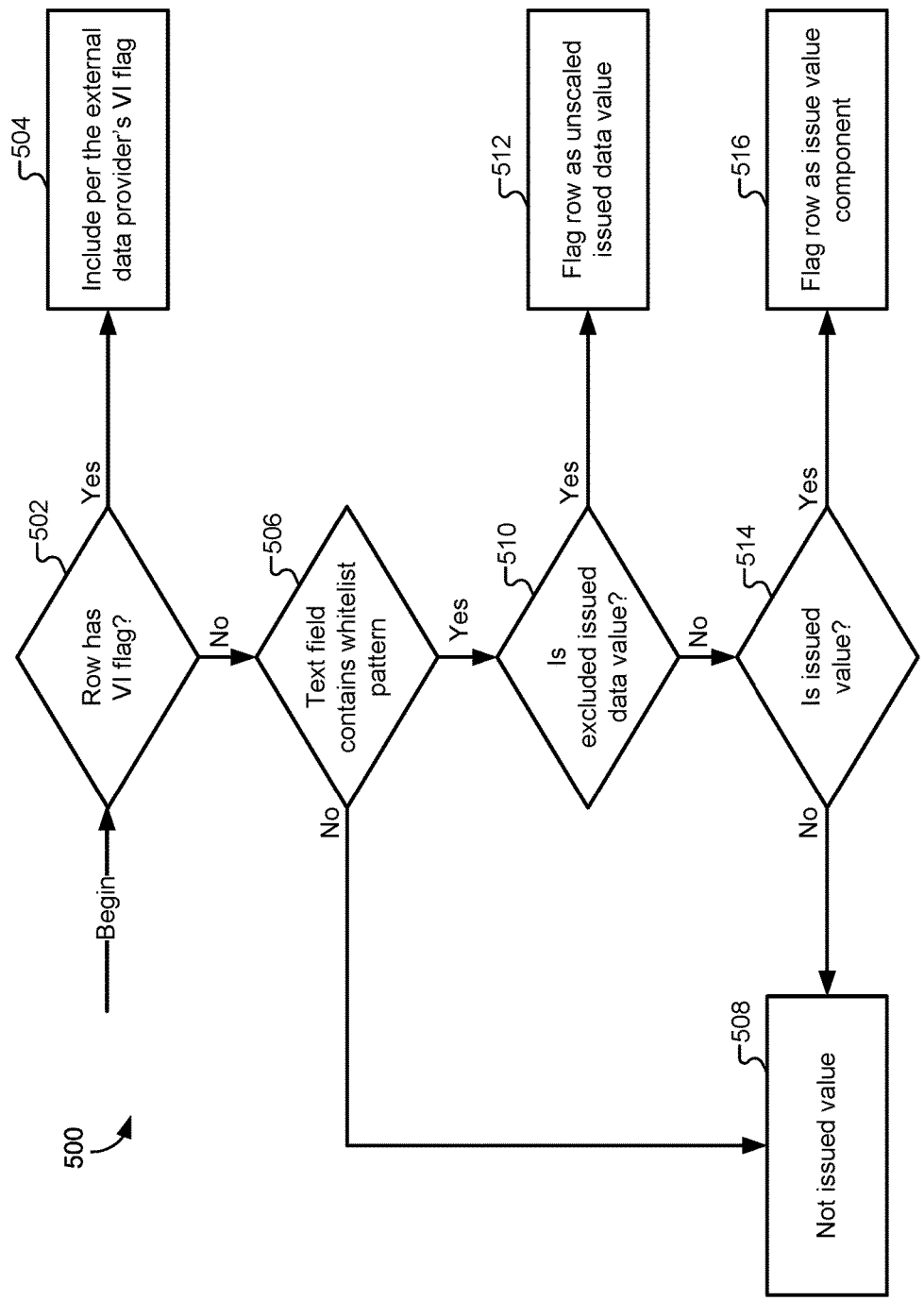
FIG. 5 illustrates a flowchart of a method for classifying data rows as inputs received from an issuing computer system, according to some embodiments.

FIG. 5 illustrates a flowchart 500 of a method for classifying data rows as inputs received from an issuing computer system, according to some embodiments. To begin, a determination can be made whether the data row has a "VI" identified by the external data store (502). If the external data store's flag indicates that the data row is an input from an issuing computer system, then the system can simply accept this data row as a contribute to a verified value based on the external data store's characterization (504). Note that in some embodiments, the characterization by the external data store need not be determinative, but can instead be used as one factor in determining whether the particular data row represents an input from an issuing computer system.

If the data row is not identified as an input from an issuing computer system by the external data store, the process can proceed by analyzing the text field for each data row. In some embodiments, a determination can be made as to whether the text field contains any character strings that are part of a whitelist. The system 106 can store a data table of whitelist strings that are commonly used to identify data rows related to inputs from an issuing computer system in the text field. The presence of a whitelist character string can automatically indicate that the input data row is associated with an issuing computer system. By comparing each character string in the text field with each entry in the whitelist table, the process can further identify inputs from an issuing computer system that may have been missed by the external data store's characterization. If no whitelist patterns are found in the text field, the data row can be flagged as not being an input from an issuing computer system (508) and eliminated from the data value estimation process.

It may be advantageous to further classify a data row as an unscaled input or a scaled input. In some embodiments, the issuing computer systems can scale down the verified values 103 provided to the user and divide them into components 172 as described above. Before sending those components to the aggregator computer system 174, the issuing computer systems 170 can scale down the components 172 by a percentage or scaling factor. In a security context this can be done to further obfuscate the verified values 103.

The whitelist in step 506 can be divided into categories that include scaled input character strings and unscaled input character strings. If the text field includes unscaled input character strings (510), then the data row can be flagged as an unscaled input received from an issuing computer system (512). Alternatively, if the text field includes character strings indicating a scaled input from the issuing computer systems (514), then the data row can be flagged as a scaled input (516). If the data row cannot be categorized as an input from issuing computer system by any of the determinations described above, then the data row can be flagged as not related to a verified value (508) and eliminated from the analysis. In some embodiments, data rows not flagged as inputs from issuing computer systems can also be deleted from the data store 126 of the system 106, thus reducing the amount of memory required for each user between verifications.

Turning back briefly to step 210 of flowchart 200, the method next can scrub the text fields in each data row. This can serve to eliminate character strings from the text fields that can vary with each input received from the issuing computer systems. For example, each input may include a security code, an input number, character strings indicating how the input was routed, and so forth. These strings do not contribute to identifying a particular issuing computer system from which the input was received, and they can thus be eliminated.

Figure 6:
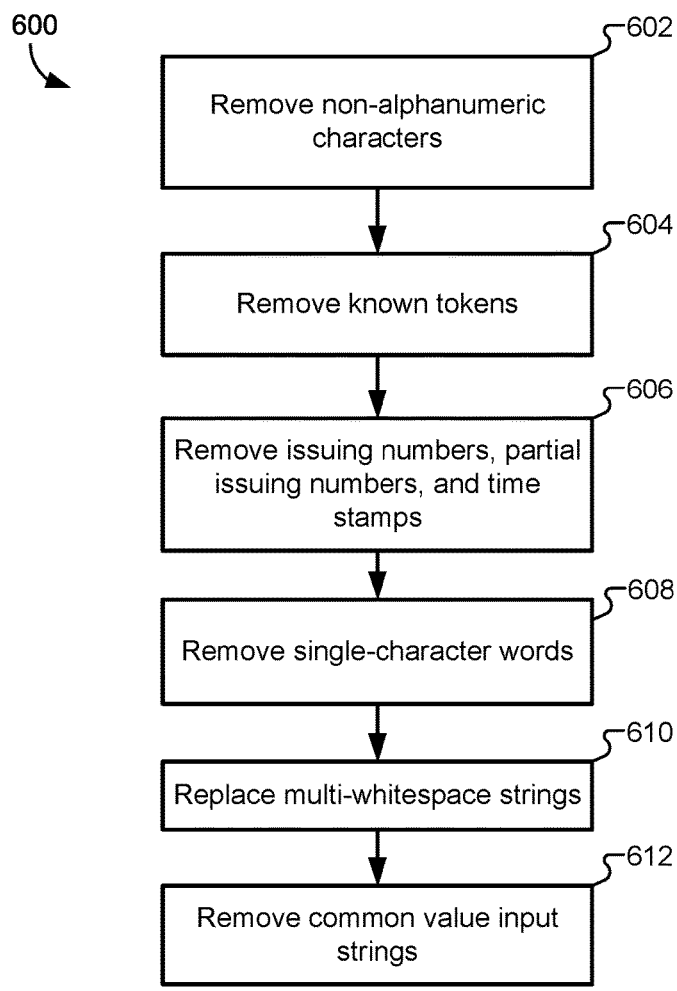
FIG. 6 illustrates a flowchart and a diagram of how text fields can be scrubbed, according to some embodiments.

FIG. 6 illustrates a flowchart 600 and a diagram of how text fields can be scrubbed, according to some embodiments. First, the process may include removing any non-alphanumeric characters (602). This step can remove hyphens, symbols, punctuation, and other non-alphanumeric characters that do not serve to identify the issuing computer system. The method may also include removing known tokens from the descriptions (604). A blacklist of known tokens can be compared to each character string in the description, and these tokens can be removed. Examples of such tokens may include "CO:", "INDN:", and "ID". Tokens on this blacklist can be assumed not to help identify the issuing computer system. For example, identifier strings may be inserted to identify types for each of the verified values. In another example, the text field may include other information that may obscure the identification of the issuing computer system. Over time, the system can identify character strings that are not useful in identifying the issuing computer system and add those tokens to the blacklist.

The process may also include removing issuing numbers, partial issuing numbers, and timestamps (606). These can be removed by comparing numeric formats with known timestamp formats and known issuing number formats. For example, timestamp formats may include XX/XX/XXXX, and issuing number formats may include XXXX-XXXX-XXXX-XXXX. Therefore this step need not remove all numeric values from the description, but instead can focus on known timestamp and issuing number formats to remove those numbers only.

The method may then remove single character words (608). Again, single characters may be inserted to identify a particular aspect of the transmission of the data row or provide a reference number for the issuing computer system, and thus the single characters are not necessary for grouping the data rows by issuing computer system or identifying these data rows as inputs from an issuing computer system in the first place. The method may additionally replace multi-white space strings with a single white space (610). This ensures that variations in white space in the text field do not unnecessarily distinguish data rows from the same issuing computer system. Finally, common value input strings can also be eliminated (612). While the strings may be useful in flowchart 500 of FIG. 5 to identify the data row as an output, a scaled input, or an unscaled input, these strings generally do not help identify an issuing computer system, and can thus be eliminated.

In one example, FIG. six includes a sample data row with a text field of "Value Issued, INCR, ValSafe #1123." After this data row is processed by the steps of flowchart 600, the text field of the data row instead simply read "ValSafe" to identify a particular issuing computer system associated with the data row.

Figure 7:
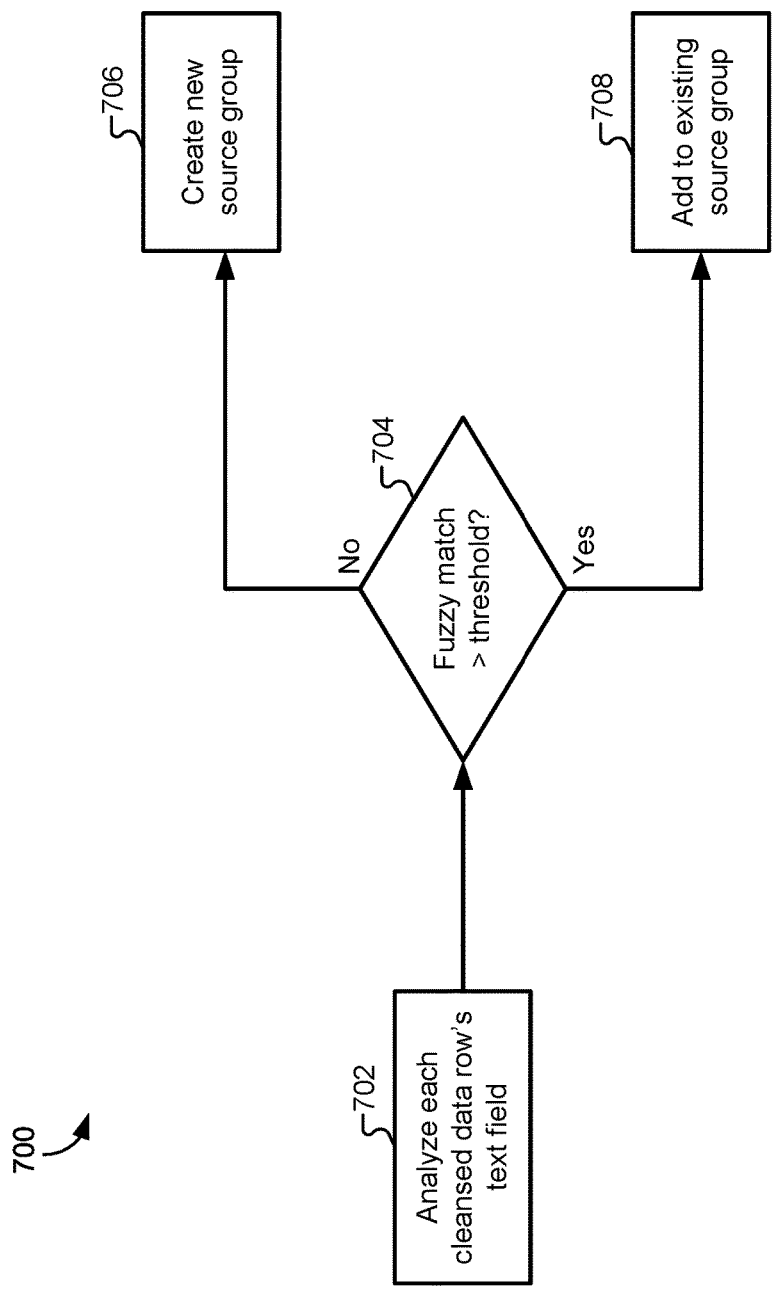
FIG. 7 illustrates a flowchart of a method for grouping data rows by source issuing computer system, according to some embodiments.

Turning back briefly to step 212 of flowchart 200, the data value estimation process can now group data rows by issuing computer systems that sourced the data rows. FIG. 7 illustrates a flowchart of a method for grouping data rows by source issuing computer system, according to some embodiments. For each data row in the plurality of data rows that remain as identified inputs from issuing computer systems, the process may begin by analyzing the cleansed text field of each data row (702). If no groups exist (i.e., this is the first data row) then the data row cannot be similar to any pre-grouped text fields, and will thus form its own new source group. For each subsequent data row that is analyzed, a fuzzy matching algorithm can be applied to the text field of that data row, and at least one data row for each existing source group (704). If there is a fuzzy match above a predefined threshold, then that data row can be added to the matching source group (708). If the fuzzy match algorithm does not generate a result above the predefined threshold, then the data row can instead be used to create a new source group, representing a new issuing computer system with a new set of input data rows (706).

In some embodiments, a library providing fuzzy text match functions may be used by the process of FIG. 7. These libraries may accept an input string, a character substring to match to the input string, and a threshold. Because the text field has been cleansed of extraneous information, a fairly low threshold may be used to identify matching issuing computer systems in the text field. For example, some embodiments may use a threshold of 60%. Other embodiments may use different thresholds, such as 50%, 55%, 65%, 70%, 75%, 80%, and so forth. Generally, because of the ordering and combination of these steps of cleansing the text field before applying the fuzzy match algorithm, the processing power and/or memory used by the fuzzy match algorithm can be significantly reduced, and matches can be more readily found with lower thresholds, thereby reducing the time required by the fuzzy match algorithm.

At this point, the process has identified and grouped all remaining input data rows for each issuing computer system represented in the plurality of data rows received on behalf of the user. The data value estimation process can now use these groups of data rows to estimate an interval value, an interval velocity, and a group value for each issuing computer system. Turning back briefly to step 214 of flowchart 200, this process can begin by calculating the interval velocity. As used herein, the term "interval velocity" refers to a rate at which inputs are received from a particular issuing computer system. Generally, the velocity or rate may be described by a number of days between inputs. This number of days may be characterized in terms of weeks, months, and/or years.

Figure 8:
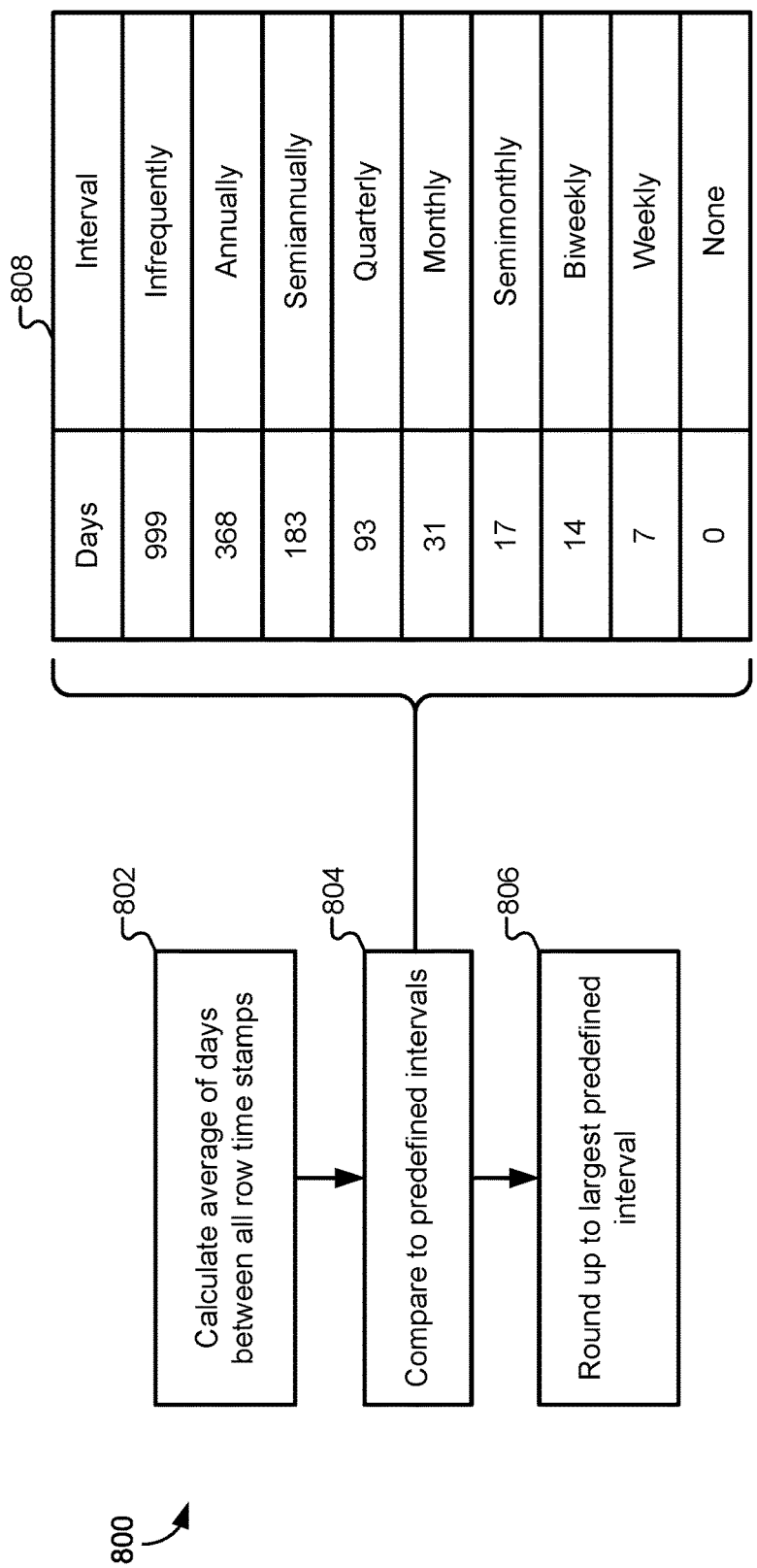
FIG. 8 illustrates a flowchart of a method for determining an input velocity, according to some embodiments.

FIG. 8 illustrates a flowchart of a method for determining an input velocity, according to some embodiments. For each group of data rows grouped by issuing computer system and ordered by timestamp, the method may calculate the average number of days between each data row received and generate an average number of days between inputs (802). Note that some data rows that are defined as occurring at regular intervals (e.g., weekly, semimonthly, monthly, etc.) may not always have timestamps occurring on those exact dates because various computer and programmatic delays may be unavoidable. For example, processing delays in the aggregator computer system, issuing delays in the issuing computer system, and/or delays in network latency can delay the transmission of data row inputs. Therefore, averaging the days between each data row input will usually lead to a fairly accurate estimate of the intended interval velocity.

Next, the method can compare the average interval velocity with a set of predefined interval velocities from a data table (804). A sample data table 808 with predefined intervals is also illustrated in FIG. 8. In order to classify the calculated average interval velocity in the data table 808, the method may round up to the largest predefined interval velocity (806). For example, if the average number of days between all data rows for issuing computer system is 16 days, the method would round this value up to 17 days in the data table 808 and output a result of "semimonthly" for the data row inputs. Note that in other embodiments, the process can round down, or round to the nearest predefined interval velocity. In some embodiments, the system may use the number of days between input data rows, then divide this by 365 days to determine an input velocity.

Figure 9:
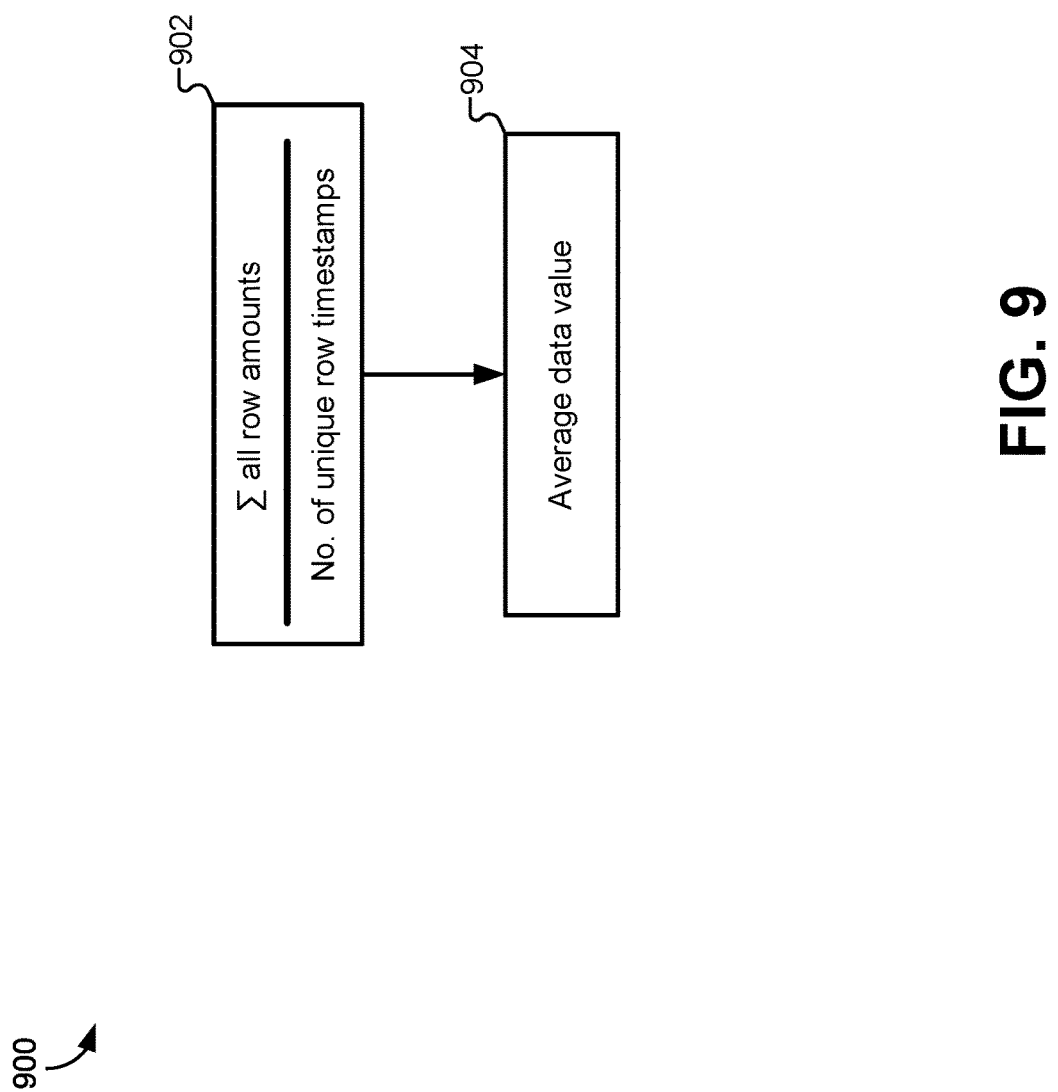
FIG. 9 illustrates a flowchart of a method for calculating average group values, according to some embodiments.

Turning back briefly to step 216 of FIG. 200, the process can now calculate a group value for each issuing computer system based at least in part on the interval velocities calculated above. FIG. 9 illustrates a flowchart 900 of a method for calculating average group values, according to some embodiments. The group value for each data row in the issuing computer system group can be aggregated to generate a total value for the data rows represented in the group. Next, the number of unique data row timestamps can be identified (902). By identifying unique input timestamps, multiple input data rows on the same day can be counted as a single data row. The total value for the group can then be divided by the number of unique timestamps to generate an average for each data row referred to herein as an "interval value" (904). In some embodiments, data rows with timestamps indicating that they were issued on the same day can be treated as having the same timestamp.

Figure 10:
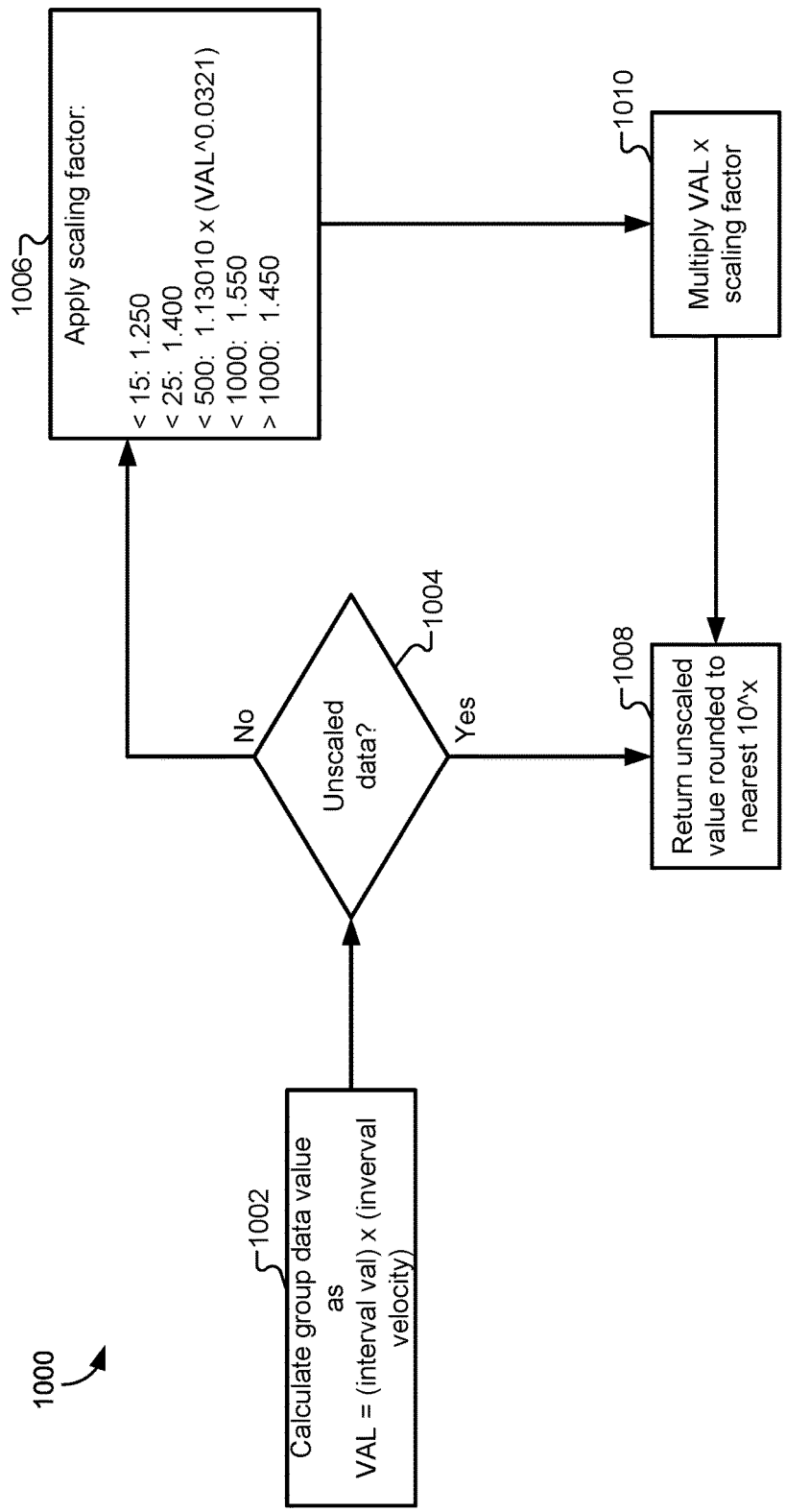
FIG. 10 illustrates a flowchart and a method for calculating a group value for each issuing computer system, according to some embodiments.

Turning back briefly to step 218 of FIG. 200, the process can now use the interval values and interval velocities calculated above to calculate an group value for each issuing computer system. FIG. 10 illustrates a flowchart 1000 and a method for calculating a group value for each issuing computer system, according to some embodiments. First, the process can generate an estimated group value by multiplying the interval value for each group found in flowchart 900 with the interval velocity found in flowchart 800 (1002). The estimated total value represents an estimation of the verified values sent from the issuing computer systems to the user. Before finalizing each estimated group value, a determination can be made as to whether this is a scaled value or an unscaled value (1004). Each group can be identified as scaled or unscaled. For unscaled group values, the estimated total value above can be finalized as the group value for that issuing computer system.

Alternatively, if the group value is not identified as unscaled data, then the group value calculated in step 1002 may need to be adjusted to account for a scaling performed by the issuing computer system. Generally, the scaling factor applied by the issuing computer system may be related to the group value calculated above. The scaling factor applied may follow a logarithmic curve function that can be used to estimate the scaling factor. In the embodiment of FIG. 10, sections of the logarithmic curve can be quantized into buckets and the average of the corresponding curve section can be applied to group values that fall within that curve interval. For example, values of less than 15k may have a scaling factor of 1.250 applied. In some embodiments, the curve of the function that applies scaling factors to group values can be dynamically modified over time. Step 1006 in FIG. 10 illustrates an example data table that applies scaling factors to various group value ranges. After a scaling factor has been selected, the final group value can be generated by multiplying the scaling factor with the group value calculated in step 1002 (1010). In some embodiments, this final group value can be rounded to the nearest $10^x$, such as 1000, added to the rest of the group values, and reported as an estimated total value for the groups. For example, each of the group values, after being scaled if necessary, can be added together. This may correspond to each of the verified values provided to the user being added together to generate the challenge value provided to the website. Therefore, the aggregation of the group values to form an estimated total value can be compared to the challenge value to verify the accuracy of the challenge value.

Turning back to FIG. 1B, after calculating the estimated total value 122, the selection logic 110 can compare the estimated total value 122 to the challenge value 104 provided by the user. If the estimated total value 122 is within a predetermined threshold amount or percentage of the challenge value 104, then the challenge value 104 can be verified as acceptable. For example, if the estimated total value 122 is within 80% of the challenge value 104, the challenge value 104 can be validated. In some embodiments, the estimated total value 122 is allowed to rise above the challenge value 104 by a predetermined percentage as well, such as 200%.

In some embodiments, multiple verification tests can be applied to determine whether the estimated total value 122 is sufficient in comparison to the challenge value 104. In addition to checking a threshold for the challenge value 104, the system may also test whether the estimated total value 122 is within standards for security rules, business rules, and/or any other regulations that require the challenge value 104 to be correct before providing the resource 116. In some embodiments, the website 108 may transmit each of the group values and/or the estimated total value to the client device 102 such that the user can see why the challenge value was verified or not verified.

Data Center Computer System

Figure 11:
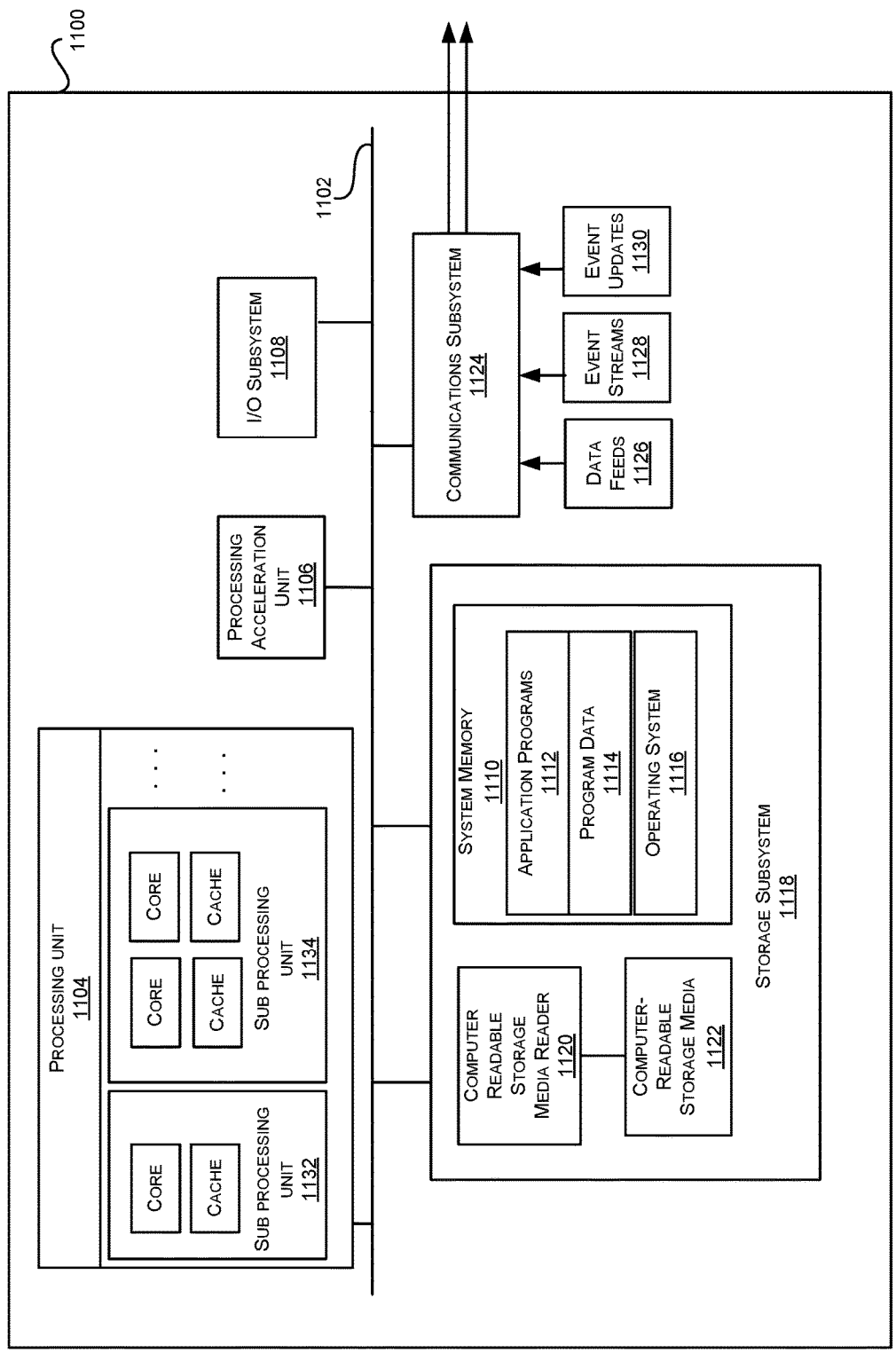
FIG. 11 illustrates an exemplary computer system, in which various embodiments may be implemented.

FIG. 11 illustrates the data center computer system 1100 described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present invention.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A system for verifying a challenge value received from a client device, the system comprising:
   a front-end website that receives the challenge value from the client device;
   a network interface that accesses one or more external data stores to receive a plurality of data rows from the one or more external data stores, wherein the plurality of data rows are associated with a user of the client device;
   one or more processors; and
   one or more memory devices comprising instructions that, when executed by the one or more processors, cause the one or more processors to perform operations comprising:
      filtering data rows from the plurality of data rows that are not sourced from one or more computer systems associated with the challenge value;
      grouping data rows from the filtered plurality of data rows into one or more groups based at least in part on which of the one or more computer systems associated with the challenge value each of the plurality of data rows were sourced;
      determining an input velocity for each of the one or more groups;
      determining an interval value for each of the one or more groups based at least in part on the input velocity;
      calculating a group value for each of the one or more groups based on the interval value and the input velocity;
      calculating an estimated total value based at least in part on the group values for each of the one or more groups;
      determining whether the challenge value can be verified by determining whether the estimated total value is within a first threshold amount of the challenge value; and
      adding or removing a task from a task list managed by a workflow manager for a resource based on whether the challenge value can be verified.

2. The system of claim 1, wherein the challenge value received from the client device is an unverified value.

3. The system of claim 1, wherein the one or more external data stores receive the plurality of data rows from one or more issuing computer systems.

4. The system of claim 3, wherein the front end website provides a portal for the client device to the one or more external data stores to log into the one or more issuing computer systems to release the plurality of data rows.

5. The system of claim 1, wherein the operations performed by the one or more processors further comprise filtering data rows from the filtered plurality of data rows where a value field does not exceed a second threshold amount.

6. The system of claim 1, wherein the operations performed by the one or more processors further comprise, after filtering and prior to grouping the data rows:
   removing non-alphanumeric tokens from a text field of the data row; and
   removing a blacklist set of known tokens.

7. The system of claim 1, wherein grouping the data rows from the plurality of data rows into the one or more groups comprises:
   forming a first group with a first data row;
   adding additional data rows to the first group when a text field in the additional data rows matches a text field in the first data row; and
   forming an additional group when a text field in a data row does not match the text field in the first data row.

8. The system of claim 7, wherein matching text fields comprises using a fuzzy match algorithm with a result above a second threshold amount.

9. The system of claim 1, wherein the operations performed by the one or more processors further comprise scaling the group value using a scaling value for a least one of the one or more groups before calculating the estimated total value; wherein the scaling value is determined based at least in part on the group value.

10. A method of verifying a challenge value received from a client device, the method comprising:
    receiving the challenge value from the client device through a front-end website;
    accessing, through a network interface, one or more external data stores to receive a plurality of data rows from the one or more external data stores, wherein the plurality of data rows are associated with a user of the client device;

filtering data rows from the plurality of data rows that are not sourced from one or more computer systems associated with the challenge value;

grouping data rows from the filtered plurality of data rows into one or more groups based at least in part on which of the one or more computer systems associated with the challenge value each of the plurality of data rows were sourced;

determining an input velocity for each of the one or more groups;

determining an interval value for each of the one or more groups based at least in part on the input velocity;

calculating a group value for each of the one or more groups based on the interval value and the input velocity;

calculating an estimated total value based at least in part on the group values for each of the one or more groups; and determining whether the challenge value can be verified by determining whether the estimated total value is within a first threshold amount of the challenge value; and adding or removing a task from a task list managed by a workflow manager for a resource based on whether the challenge value can be verified.

11. The method of claim 10, further comprising adding or removing a task from a task list for a resource based on whether the challenge value can be verified.

12. The method of claim 10, wherein the challenge value received from the client device is an unverified value.

13. The method of claim 10, wherein the one or more external data stores receive the plurality of data rows from one or more issuing computer systems.

14. The method of claim 13, wherein the front end website provides a portal for the client device to the one or more external data stores to log into the one or more issuing computer systems to release the plurality of data rows.

15. The method of claim 10, further comprising filtering data rows from the filtered plurality of data rows where a value field does not exceed a second threshold amount.

16. The method of claim 10, further comprising, after filtering and prior to grouping the data rows:

removing non-alphanumeric tokens from a text field of the data row; and removing a blacklist set of known tokens.

17. The method of claim 10, wherein grouping the data rows from the plurality of data rows into the one or more groups comprises:

forming a first group with a first data row;

adding additional data rows to the first group when a text field in the additional data rows matches a text field in the first data row; and forming an additional group when a text field in a data row does not match the text field in the first data row.

18. The method of claim 17, wherein matching text fields comprises using a fuzzy match algorithm with a result above a second threshold amount.

19. The method of claim 10, further comprising scaling the group value using a scaling value for at least one of the one or more groups before calculating the estimated total value; wherein the scaling value is determined based at least in part on the group value.

* * * * *